United States Patent
Onozawa

(10) Patent No.: US 7,433,586 B2
(45) Date of Patent: Oct. 7, 2008

(54) CAMERA WITH AN AUTO-FOCUS FUNCTION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 325 days.

(21) Appl. No.: 11/194,434

(22) Filed: Aug. 1, 2005

(65) Prior Publication Data

US 2006/0072915 A1    Apr. 6, 2006

(30) Foreign Application Priority Data

Aug. 18, 2004    (JP)    ............... 2004-237815

(51) Int. Cl.
 G03B 13/34    (2006.01)
 G03B 3/10     (2006.01)
 G03B 13/30    (2006.01)
 G03B 17/18    (2006.01)
 H04N 5/232    (2006.01)
 G02B 7/04     (2006.01)
 G02B 27/40    (2006.01)
 G02B 27/64    (2006.01)

(52) U.S. Cl. ................ 396/121; 396/103; 396/123; 396/124; 396/130; 396/147; 348/346; 348/349; 250/201.2

(58) Field of Classification Search ............ 396/89, 396/103, 104, 121, 123, 124, 130, 147; 348/345, 348/346, 349, 353; 250/201.2, 201.7
See application file for complete search history.

(56) References Cited

U.S. PATENT DOCUMENTS

| | | | | |
|---|---|---|---|---|
| 4,358,673 A | * | 11/1982 | Wittenberger | 250/204 |
| 5,227,833 A | * | 7/1993  | Ishida et al. | 396/92 |
| 5,264,889 A | * | 11/1993 | Ishida et al. | 396/50 |
| 5,363,169 A | * | 11/1994 | Ishida et al. | 396/123 |
| 5,623,706 A | * | 4/1997  | Kosako       | 396/67 |
| 6,157,783 A | * | 12/2000 | Ide          | 396/106 |
| 6,263,164 B1 | * | 7/2001 | Nakahara et al. | 396/104 |
| 6,771,899 B2 | * | 8/2004 | Nonaka       | 396/121 |
| 2001/0010556 A1 | * | 8/2001 | Sugimoto et al. | 348/345 |
| 2004/0028401 A1 | * | 2/2004 | Nonaka       | 396/121 |

FOREIGN PATENT DOCUMENTS

| JP | 7-46455 A   | 2/1995 |
|----|-------------|--------|
| JP | 11-177875 A | 7/1999 |
| JP | 2000-98478 A | 4/2000 |
| JP | 2004-20773 A | 1/2004 |

* cited by examiner

*Primary Examiner*—Rochelle-Ann Blackman
(74) *Attorney, Agent, or Firm*—Frishauf, Holtz, Goodman & Chick, P.C.

(57) ABSTRACT

A first area of a predetermined size is set as a focus area from which AF evaluation values are picked up in AF control when a focus mode is a normal one. When the focus mode changes to a macro mode, a second area narrower than the first area is set as the AF area. Thus, in the macro mode, focus search is performed automatically through the narrower area. AF frames indicative of the first and second areas are displayed on a through image.

8 Claims, 8 Drawing Sheets

CAMERA WITH AN AUTO-FOCUS FUNCTION

CROSS-REFERENCE TO RELATED APPLICATIONS

This application is based upon and claims the benefit of priority from the prior Japanese Patent Application No. 2004-237815, filed on Aug. 18, 2004, the entire contents of which are incorporated herein by reference.

BACKGROUND OF THE INVENTION

1. Field of the Invention

The present invention relates to cameras including digital cameras with an auto-focus function and an auto-focus control system.

2. Background Art

In the past, cameras including digital cameras normally have an AF (auto-focus) function that, in one image pickup mode, shows a user a focus frame at a predetermined position on an electronic view finder (usually, at its center), for example, of a liquid crystal monitor, thereby informing the user that the camera is now focused on that part of an object image which is surrounded by the focus frame. Some digital cameras use a technique for performing the focusing operation in accordance with a contrast detection system based on image information in an area within the displayed focus frame and also allowing the user to change the position of the focus frame.

SUMMARY OF THE INVENTION

In one aspect, the present invention provides a camera apparatus comprising:

focus area setting means for setting a focus area on an object image to be picked up;

auto-focus performing means for performing an auto-focus operation based on image information in the focus area set by the focus area setting means;

operational mode selecting means for selecting one of a plurality of different operational modes that include a normal mode and a macro mode;

first focus area control means for causing the focus area setting means to set a first area as the focus area when the operational mode selected by the operational mode selecting means is the normal mode; and second focus area control means for causing the focus area setting means to set a second area narrower than the first area as the focus area when the operational mode selected by the operational mode selecting means is the macro mode.

In another aspect, the present invention provides an auto-focus control method comprising the steps of:

selecting one of a plurality of different operational modes that include a normal mode and a macro mode;

setting a first area as a focus area on an image of an object to be picked up when the normal mode is selected as the operational mode;

setting a second area narrower than the first area as the focus area when the macro mode is selected as the operational mode; and performing an auto-focusing operation based on image information in the focus area set in the setting step.

In still another aspect, the present invention provides a computer readable auto-focus control program that causes a computer of a camera to perform the following steps of:

selecting one of a plurality of different operational modes that include a normal mode and a macro mode;

setting a first area as a focus area on an image of an object to be picked up when the normal mode is selected as the operational mode;

setting a second area narrower than the first area as the focus area when the macro mode is selected as the operational mode; and performing an auto-focusing operation based on image information in the focus area set in the setting step.

BRIEF DESCRIPTION OF THE DRAWINGS

The accompanying drawings, which are incorporated in and constitute a part of the specification, illustrate presently preferred embodiments of the present invention and, together with the normal description given above and the detailed description of the preferred embodiments given below, serve to explain the principles of the present invention in which.

DETAILED DESCRIPTION OF THE INVENTION

Figure 1:
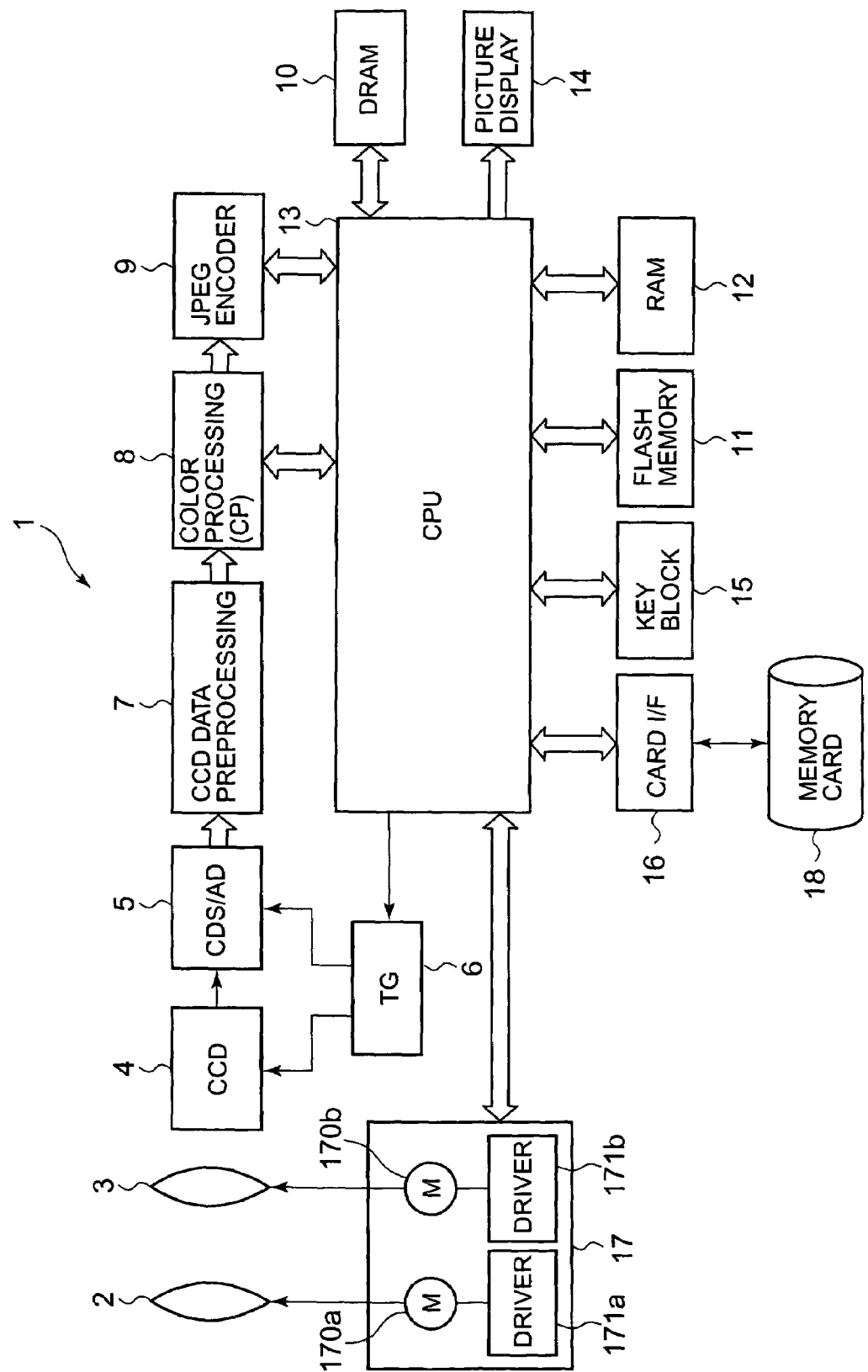
FIG. 1 is a block diagram of a digital camera according to the present invention.

A digital camera of one embodiment according to the present invention will be described. FIG. 1 is a block diagram of the digital camera 1. The digital camera 1 has an AF function and comprises a focusing lens 2, a zoom lens (or zoom means) 3, a CCD 4, a CDS/AD block 5, a TG (Timing Generator) 6, a CCD data preprocessing block 7, a color processing block (CP) 8, a JPEG encoder 9, a DRAM 10, a built-in flash memory 11, a RAM 12, a CPU 13, an image display 14, a key block 15, a card interface 16, and a motor drive block 17. Card interface 16 is connected to a memory card 18 removably set in a card slot in a camera body (not shown).

Each of focus and zoom lenses 2 and 3 includes a group of lens (not shown). Motor drive block 17 comprises a focus motor 170a that drives focus lens 2 along the optical axis, and motor drivers 171a and 171b that drive focus and zoom motors 170a and 170b, respectively, in accordance with control signals from CPU 13.

CCD 4 is image pickup means that performs photoelectric conversion of an image of an object projected on CCD 4 via focus and zoom lenses 2 and 3, and then outputs a corresponding image pickup signal. TG 6 generates a timing signal of a predetermined frequency that drives CCD 4. CDS/AD block 5 samples an output signal from CCD 4, eliminates noise and converts the signal to a digital signal. CCD data preprocessing block 7 performs a data processing operation such as luminance signal processing on the digital signal. Color processing (CP) block 8 performs a color processing operation including color separation on an image signal outputted from CCD data preprocessing block 7, thereby producing Y, Cb and Cr image data. DRAM 10 sequentially stores the Y and Cb and Cr image data.

Image display 14 comprises a color LCD and a driver that drives the color LCD. In an image-pickup wait state where no shutter key is depressed in a record mode, image display 14 displays a through image based on image data for one frame (or picture) captured from CCD 4 and stored in DRAM 10. In a reproduction mode, image display 14 displays a recorded image based on image data that is read from memory card 18 and expanded. Image display 14 also displays various other information as needed and functions as display means recited in the attached claims.

JPEG encoder 9 JPEG compresses image data received from CP block 8 when the image is recorded. Memory card 18 records compressed image data received via card interface 16. When the recorded image data is to be reproduced, it is read, expanded by JPEG encoder 9 and displayed on image display 14. Key block 15 comprises a changeover key that selects one of the image pickup and reproduction modes, a shutter key, a zoom key that changes a zoom power, an AF mode select key used to set an AF mode to be described later and an AF (or focus) area switch key that is used to select one of AF areas, and delivers a key operated signal to CPU 13. The shutter key causes the user to select one of a half depression for notifying the user of image pickup beforehand and a full depression for giving an image pickup command.

Flash memory 11 has stored programs for control of digital camera 1 by CPU 13, that is, for AF, AE (Auto-Exposure) and AWB (Auto-White Balance) controls, and various data. Flash memory 11 has also stored various data on operation of digital camera 1 set by the user. CPU 13 operates RAM 12 as a working memory in accordance with operation signals from key block 15 and the programs such that CPU 13 functions as focus area setting means, auto-focus control means, operation mode select means, focus area control means, display control means, or set mode select means.

The AF control involves a contrast detection system in which focus lens 2 is moved along the optical axis, AF evaluation (or contrast) values representing the respective focused extents of images picked up at positions on the optical axis are detected from the corresponding images and the position of a peak of the AF evaluation values is handled as a corresponding focused position. As the AF mode, one of two "normal" and "macro" modes is settable. A focusable range in the normal mode involves approximately 40 cm before the camera through infinity, and a focusable range in the macro mode involves a shortest image pickup distance (of approximately 6 cm) from the camera (that is, a near end of the focusable range) through approximately 50 cm determined depending on the optical characteristics of the focus and zoom lenses 2 and 3 in order to ensure the speed and accuracy of the AF operation by limiting a search range for a focused position (or the position of a peak of the AF evaluation value curve) and to search the peak accurately in a short time.

Figure 2:
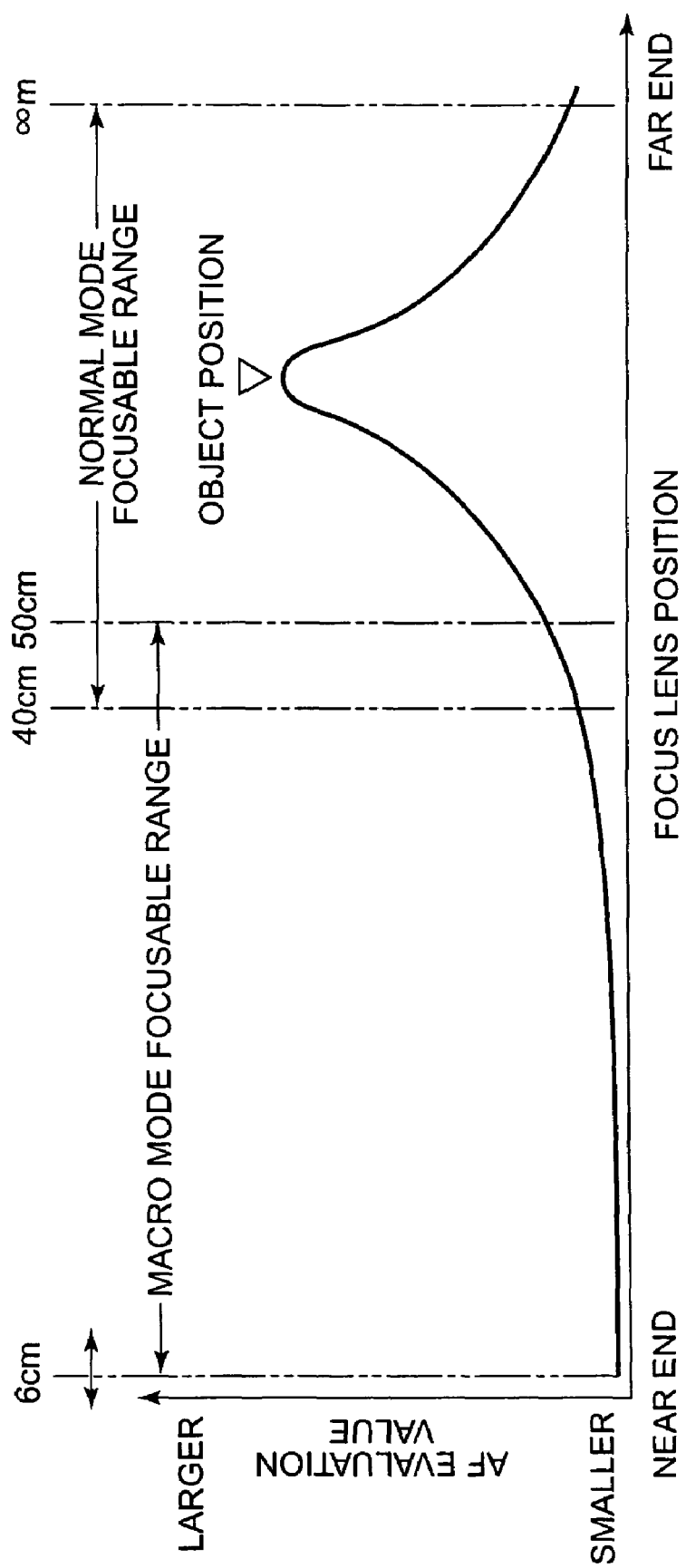
FIG. 2 illustrates two different focus position search ranges changing depending on corresponding different auto-focus (AF) modes.

It is to be noted that in the present embodiment the moving range of focus lens 2 corresponding to the search range changes depending on the position of zoom lens 3 in order that the search range does not change even when the position of zoom lens 3 changes depending on a picture angle (or zoom power). Thus, the search range is a range of distance from the camera to the object where the camera is actually focusable on the object, i.e., the focusable range. As shown in FIG. 2, the search range in the macro mode involves its shortest image pickup distance (or near-end distance) before the camera determined by the optical characteristics of the focus and zoom lenses 2 and 3 through 50 cm. The search range in the normal mode is 40 cm before the camera through infinity. It is to be noted that the shortest image pickup distance changes depending on the zoom lens position, and is, for example, 6 cm.

In this embodiment, in addition to the AF mode an AF area is settable by the AF function. This function specifies which part of the object image should be an AF area, that is, which part of the object the focus lens 2 should be focused on. More specifically, to this end, one of "spot" that handles a single central part of a picture displayed on the image display as the AF area and "multi" that handles seven respective parts of the picture as the AF areas is selectable. The AF area and mode are settable not in a trade-off relationship, but independent of each other.

Figure 3:
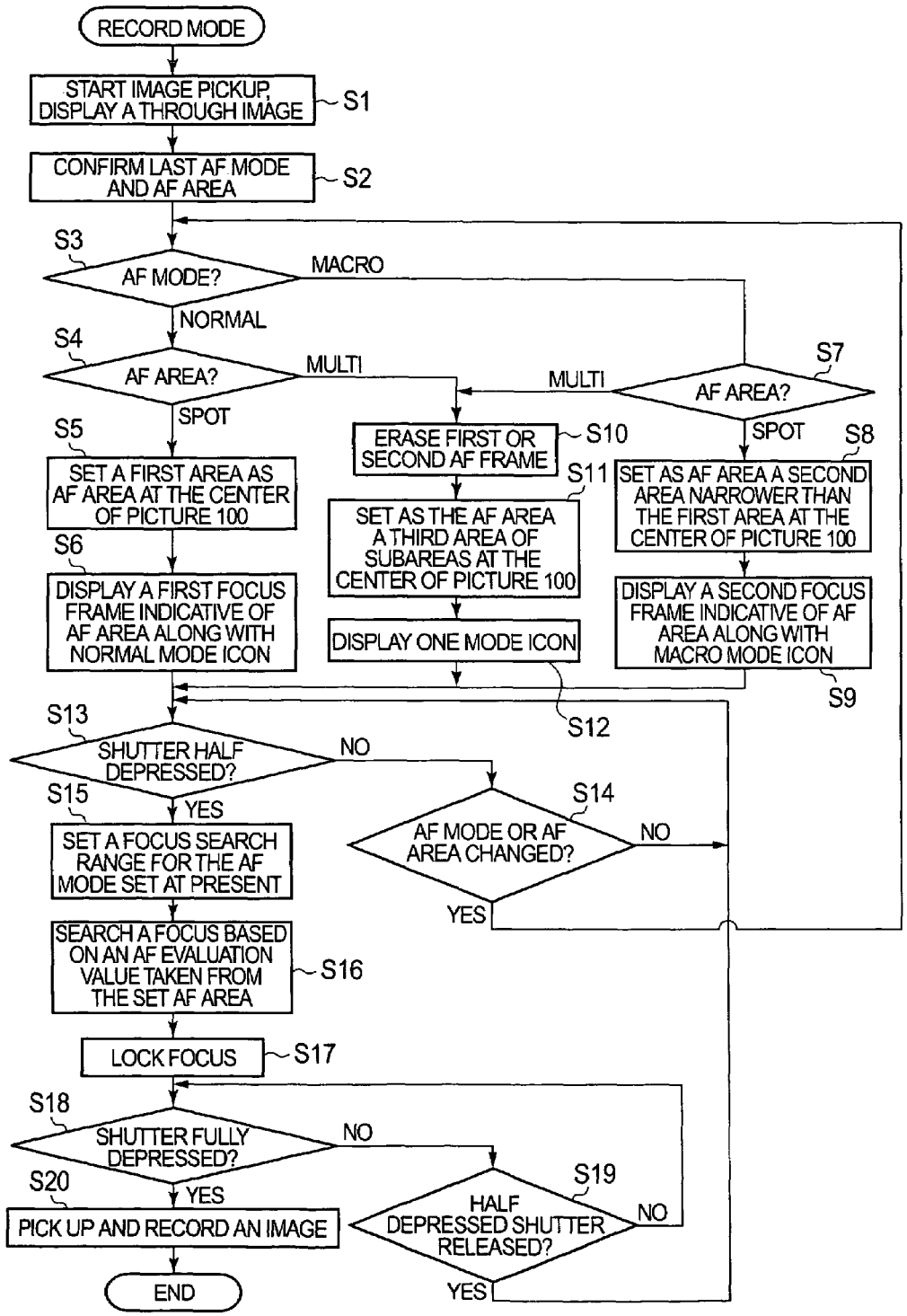
FIG. 3 is a flowchart of a process to be performed by a CPU in a record mode.

Operation of digital camera 1 according to this invention will be described next. FIG. 3 is a flowchart indicative of a process to be performed by CPU 13 in the record mode. As shown in FIG. 3, simultaneously with the setting of the record mode, CPU 13 starts to pick up images of an object and display corresponding through images at a predetermined frame rate (step S1), refers to set information stored in flash memory 11 and confirms the last AF mode and the last AF area (step S2).

Figure 4A:
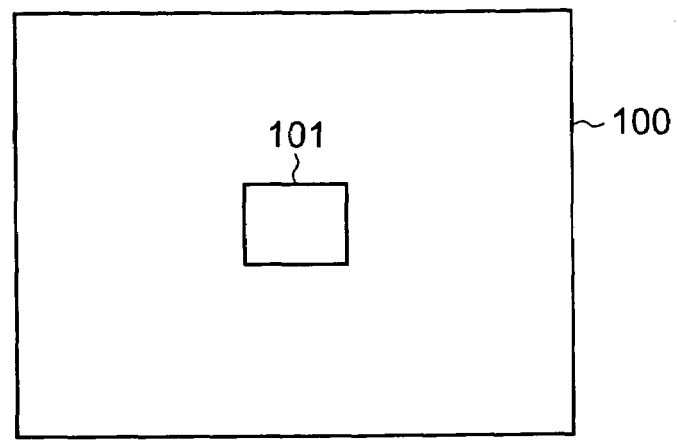
FIGS. 4A, 4B and 4C show three different AF (Auto-Focus) areas, respectively, set in the record mode.
Figure 5A:
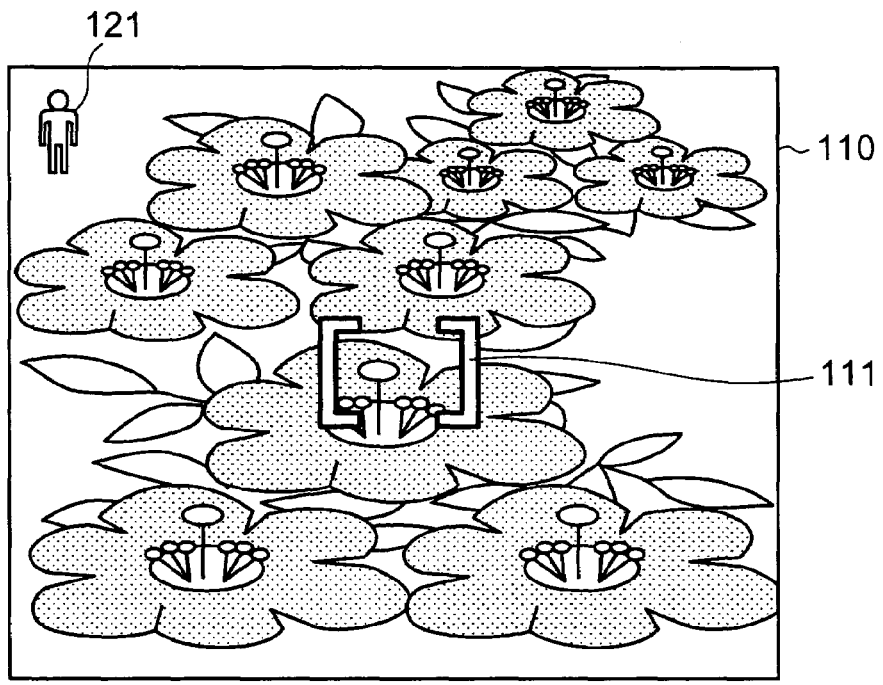
FIGS. 5A and 5B show two different pictures displayed in a "spot" AF area on an image display in normal and macro AF modes, respectively.

When the last AF mode and area were the normal mode and "spot" ("normal" in step S3 and "spot" in step S4), respectively, a first area 101 of a predetermined size is set as an AF area at the center of a picture 100, as shown in FIG. 4A (step S5). Subsequently, as shown in FIG. 5A, a first AF frame 111 corresponding in size to first area 101 is displayed at the same position as first area 101 over a through image 110 displayed on the color LCD of image display 14, and a mode icon 121 indicative of the normal mode is displayed at an upper left corner of image 110 (step S6).

Figure 4B:
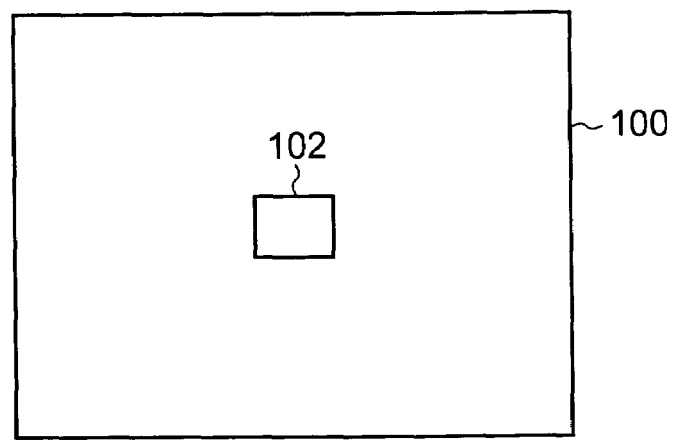
Figure 5B:
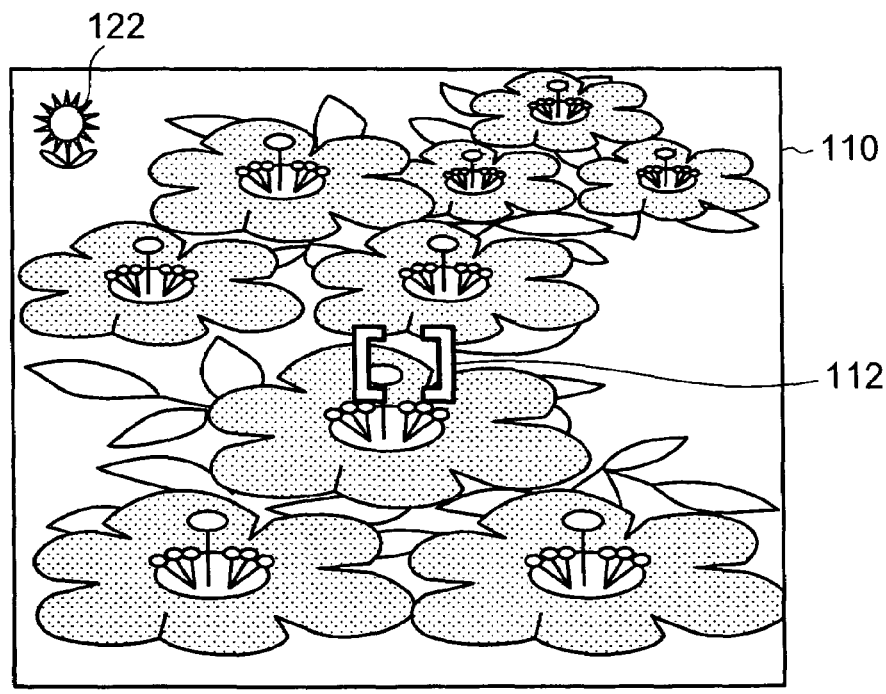

When the last AF mode was the macro mode and the last AF area was "spot" ("macro" in step S3 and "spot" in step S7); a second area 102 narrower than first area 101 is set as the AF area at the center of picture 100, as shown in FIG. 4B (step S8). Subsequently, as shown in FIG. 5B, a second AF frame 112 corresponding in size to second area 102 is displayed at the position of second area 102 over a through image 110 displayed on the color LCD of image display 14, and a mode icon 122 indicative of the macro mode is displayed at an upper left corner of picture 110 (step S9).

Figure 4C:
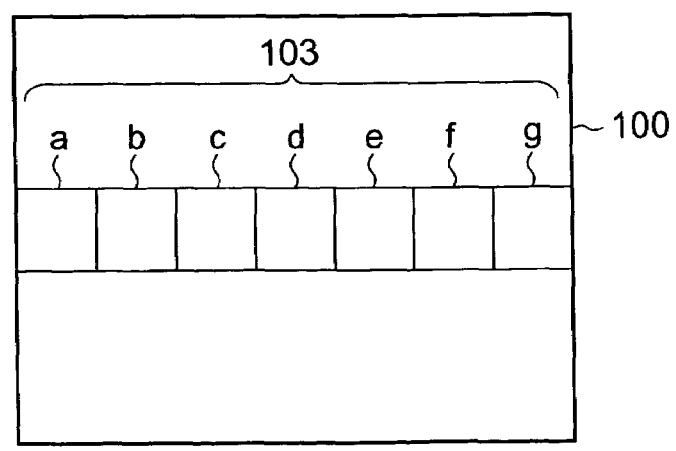

When the last AF area was "multi" ("multi" in step S4 or S7), whether the last AF mode was the normal mode or the macro one, and any one of first and second AF frames 111 and 112 was displayed on through image 110 at this time, it is erased (step S10). This processing skips at the start of the record mode. Next, as shown in FIG. 4C, a third area 103 consisting of seven subareas a, b, c, . . . g arranged through the whole horizontal central stripe part of picture 100 is set as the AF area (step S11). Each AF evaluation value is taken from a respective one of the seven subareas of third area 103. Subsequently, a relevant one of mode icons 121 and 122 indicative of the AF mode at this time is displayed (step S12).

Then, half depression of the shutter key is waited (NO in each of steps S13 and S14). Meanwhile, when the AF mode is changed by the user's AF mode select key operation or the AF area is changed by the user's AF area switch key operation (YES in step S14), control returns to step S3 to repeat the process of steps S3 and subsequent steps depending on the content of the mode or AF area changing. More particularly, when the AF mode select key is operated such that the AF mode is changed from the normal mode to the macro mode or vise versa in a state in which "spot" is set in the AF area, first and second AF frames 111 and 112 are changed with each other and simultaneously mode icons 121 and 122 are also changed with each other on through image 110. When the AF mode is changed in a state in which "multi" is set in the AF area, only mode icons 121 and 122 are changed with each other. When the AF area is changed to "multi" by the AF area switch key in a state in which "spot" is set in the AF area, a relevant one of mode icons 121 and 122 remains and only a corresponding one of first and second focus frames 111 and 112 is erased. Alternatively, when "multi" is set as the AF area, a third AF frame (not shown) corresponding to third area 103 may be displayed on through image 110.

When the shutter key is half depressed (YES in step S13), a focus search range (i.e., relevant one of the macro mode focusable range and the normal mode focusable range in FIG. 2) corresponding to the AF mode set at that time is set (step S15), and a focus is searched in the focus search range set at step S15 based on the AF evaluation values acquired from the image information on the focus area (including the relevant one of first-third areas 101-103) set at that time (step S16). The focus search in the third area 103 (when "multi" is set as the AF area) is performed based on the image information on that of subareas a, b, c, ... g (see FIG. 4C) which has a peak of the AF evaluation values at a position on the side of a near end of the focusable range. Then, the focus lens is moved to the focused position obtained by the focus search and then the focus is locked there (step S14). Then, when the shutter key is not fully depressed but released from its half-depressed state (NO in step S18 and YES in step S19), control returns to step S13. If the shutter key is then fully depressed (YES in step S18), the image pickup process is performed and then the picked-up image is recorded (step S20), which completes a first image pickup operation.

When the AF area is set to "spot" in the above operation, the AF area in which the AF mode is set to the macro mode is narrower than the AF area in which the AF mode is set to the normal mode. Thus, when the focus search is performed in step S16, it can be automatically performed in the narrower focus area and the camera can be focused easily on a desired particular part of the object even when in the macro mode the distances between the object and the respective parts of the AF area in the focusable range greatly differ.

Figure 6:
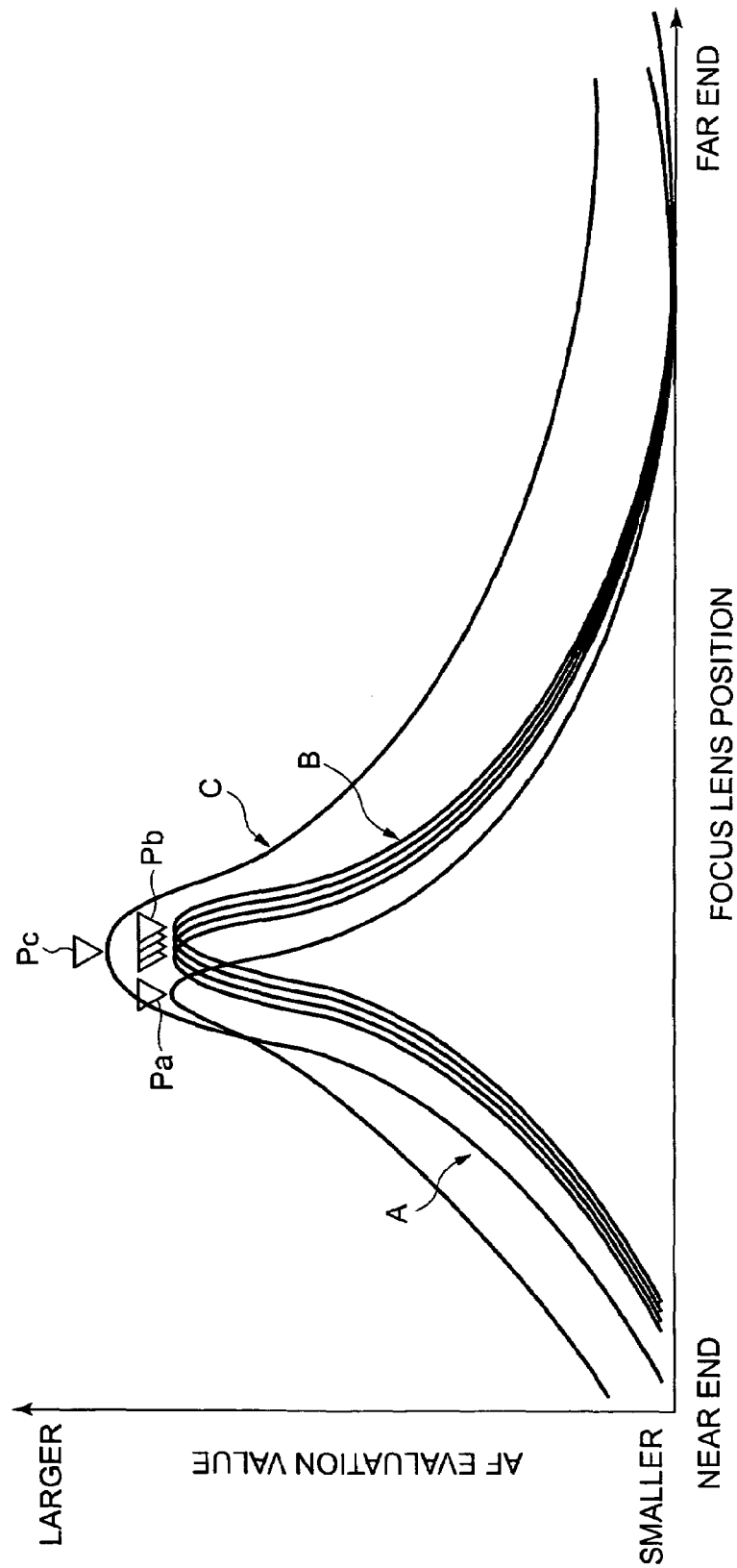
FIG. 6 shows distributions of AF evaluation values where focused positions differ depending on the sizes of the AF areas.

More specifically, it is first considered that in the macro mode the camera will be focused, for example, on a pistil of a flower as the object in the macro mode, as shown in FIGS. 5A and 5B. If the AF area is as wide as first area 101 set in the normal mode shown in FIG. 5A, a plurality of stamen images would enter the focus area in addition to the pistil. FIG. 6 illustrates distributions of AF evaluation values in this case. In FIG. 6, a distribution curve A represents an AF evaluation value distribution for the pistil and Pa indicates its peak and position. Similarly, a distribution curve group B represents a plurality of AF stamen image evaluation value distributions and Pb their peaks and positions. Thus, when the camera is auto-focused on the pistil, it should originally be focused on the peak position Pa of the AF pistil evaluation value distribution (represented by curve A), thereby obtaining a completely focused state. However, because the focus area is wide, the group of stamen evaluation value distributions (represented by the distribution curve group B) will mix with the pistil evaluation value distribution. As a result, a peak position Pc on a distribution curve C comprising a combination of the pistil and stamen AF evaluation value distributions (represented by A and B) is a focused position.

Accordingly, as described above, because the AF area is set as second area 102 narrower than first area 101 in the macro mode, a percentage of the stamen images entering second area 102 is greatly reduced. Thus, an AF evaluation value distribution similar to the pistil evaluation value distribution is obtained in second area 102, and a position extremely near to peak position Pa on distribution curve A is obtained as a focused position. Thus, even when the image pickup is performed in the macro mode, the camera can be easily focused on a desired part of the object.

When in the embodiment the AF area is set as second area 102 narrower than first area 101 in the macro mode, second AF frame 112 corresponding in size to second area 102 is displayed at the position of second area 102 on through image 110. Thus, a focused position is clearly indicated to the user, thereby assisting the user greatly in determining his or her compositional arrangement.

While the embodiment with the normal and macro modes as the AF modes has been illustrated, it may additionally have an intermediate AF mode in which the focusable range extends over both the normal and macro modes. Also in this case, an AF area in which the macro mode is set may be narrower than that in which the normal mode is set to obtain advantageous effects similar to those produced by the embodiment.

While in the embodiment the size of the AF area is illustrated as changed depending on each of the plurality of different AF modes in which the corresponding focusable ranges (or AF search ranges) differ, the present invention is not limited to this particular case. For example, even when the contents of the focus control are the same, the size of the AF area may be changed depending on a respective one of a plurality of different image pickup modes prepared, more specifically, in which only systems of processing the picked-up images (for example, a skin color emphasizing mode) are different or a respective one of a plurality of different image pickup modes which are different in purpose of use (for example, close-up image pickup mode). In other words, one of the normal mode in which first area 101 is set in the AF area and the macro mode in which the AF area is set in second area 102 may be selected and set as the operational mode depending on a respective one of the plurality of image pickup modes set manually by the user.

While the two-stage control of the size of the AF area has been illustrated, the size of the AF area may be controlled in a multi-stage fashion (of more than three stages) depending on changing the AF or image pickup mode.

Even when the user does not perform a particular operation such as changing the AF mode or the image pickup mode, the size of the AF area may be changed automatically depending on certain parameters such as the distance from the camera to the object. As an example, in a camera with the AF function in the contrast detection system as in the embodiment, when the shutter is half depressed and the focus search is performed, the distance from the camera to the object may be calculated based on the position of focus lens 2. When the distance from the camera to the object is more than a predetermined distance, the AF area may be set automatically in the first area whereas when the distance is less than the predetermined distance, the AF area may be set automatically in the second area. In this case, of course, the size of the AF area may be controlled in a multi-stage fashion. Alternatively, the distance from the camera to the object may be obtained from a distance sensor such as a phase difference detector.

Figure 7:
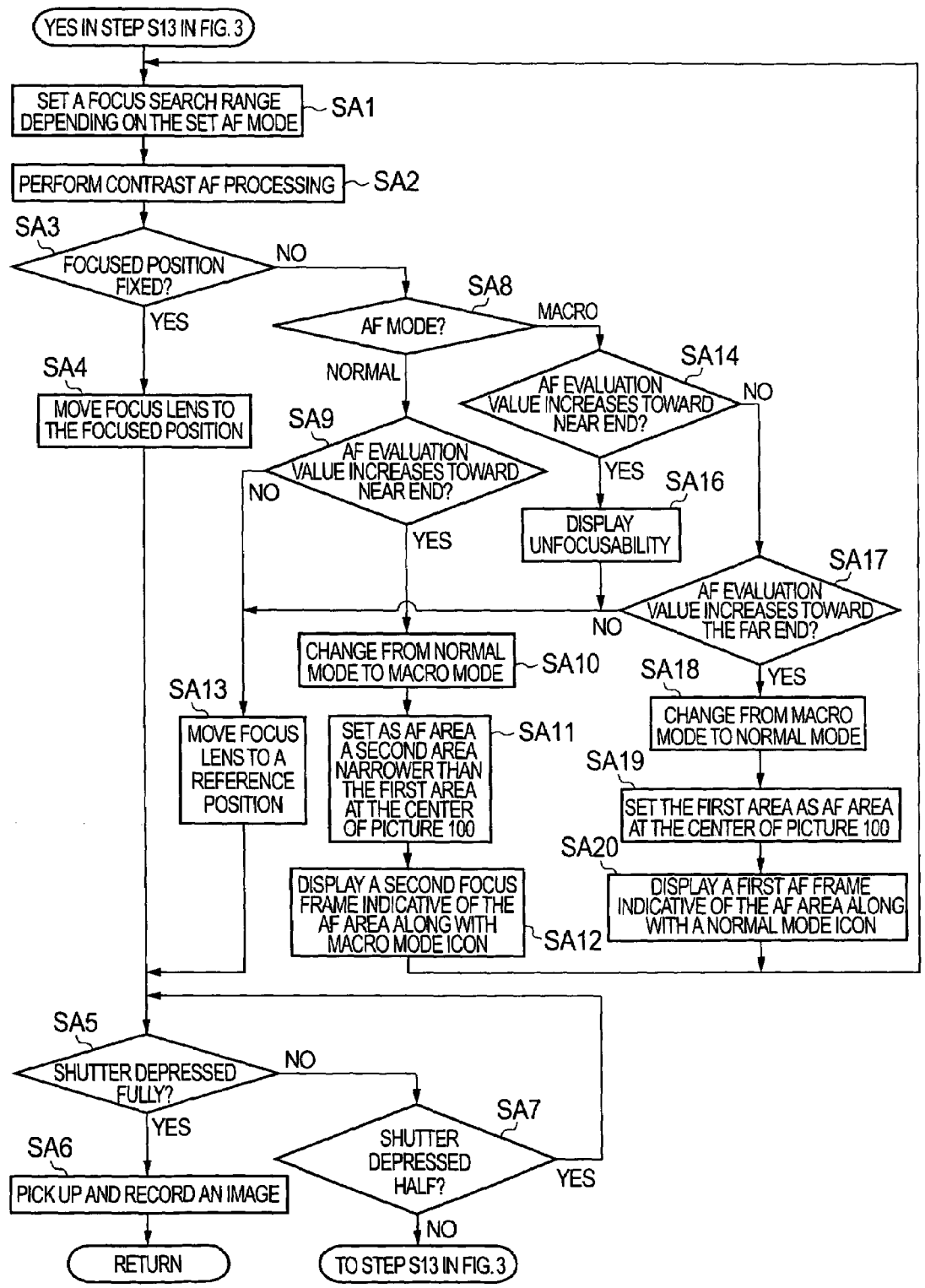
FIG. 7 is a flowchart of another process to be performed by the CPU in the record mode.

Alternatively, as shown in a flowchart of FIG. 7, if no focused position can be found in a focus search range for the AF mode selected by the user's AF mode select key operation, the AF mode may be changed automatically, thereby changing the size of the focus area.

FIG. 7 is a flowchart of another process to be performed by CPU 13 in the record mode. For the purpose of simplification, explanation of a CPU operation to be performed when "multi" is selected and set as the AF area will be omitted.

When half depression of the shutter key is detected in step S13 of FIG. 3, a focus search range corresponding to the AF mode set at this time is set (step SA1), an AF process is performed in the contrast detection system (step SA2). When the focused position is fixed (YES in SA3), focus lens 2 is moved to the fixed focused position (step SA4). Then, while the shutter key is being half depressed, full shutter key depression (that gives an image pickup command) is waited (NO in step SA5 and YES in step SA7). If the shutter key is then depressed fully (YES in step SA5), the image pickup process is performed, the picked-up image is encoded and stored as image data on memory card 18 (step SA6). When the half depression of the shutter key is released (NO in step SA7), control returns to step S13 of FIG. 3.

Figure 8A:
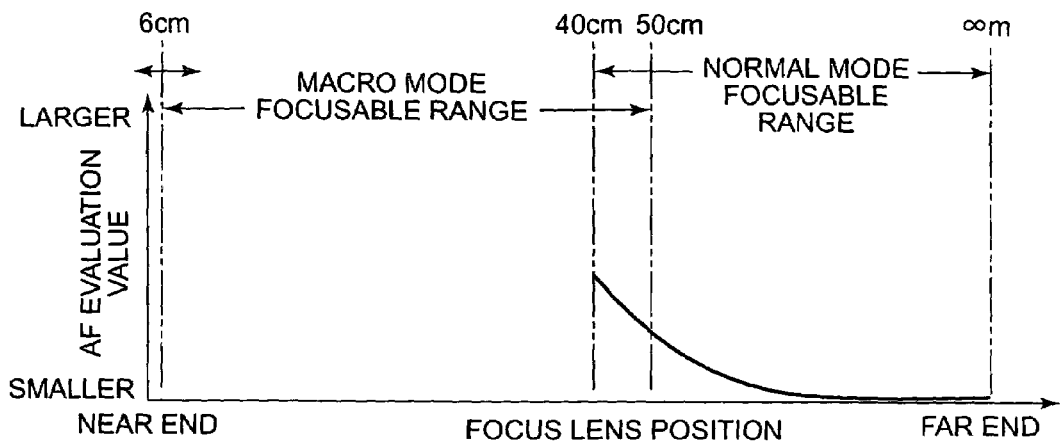
FIGS. 8A, 8B and 8C illustrate changes in the respective AF evaluation values when no focused positions can not be fixed in an AF process.

When no focused position is fixed in the AF process, that is, the focused position cannot be searched (NO in step SA3), the following process will be performed. First, if the set AF mode is the normal mode at this time ("normal" in step SA8), it is checked whether the AF evaluation value tends to increase toward the near end of the focus search range, for example, as shown in FIG. 8A (step SA9). If so, there is a high possibility that the distance from the camera to the object will be within the search range in the macro mode. Thus, the mode is changed from the AF mode automatically to the macro mode (step SA10). As shown in FIG. 4B, second area 102 narrower than first area 101 is set as the AF area at the center of picture 100 (step SA11). Subsequently, as shown in FIG. 5B, second AF area 112 corresponding in size to second area 102 is displayed at the position of second area 102 over through image 110 displayed on the LCD of the image display 14 with the mode icon 122 indicative of the macro mode displayed at the upper left corner of image 110 (step SA12). Then, control returns to step SA1 where the focus search range is changed and then the AF process is performed again.

When the result of determination in step SA9 is NO and the AF evaluation value does not tend to increase toward the near end of the focusable range (also including a case in which the object is dark), focus lens 2 is moved to a predetermined reference position, for example, to the center of the focus search range in the normal mode (step SA13) and then control passes to step SA5. In this case, the user temporarily releases the half depressed shutter key, changes the focused point on the object to another, again depresses the shutter key half or depresses the shutter key fully, thereby performing image pickup.

Figure 8B:
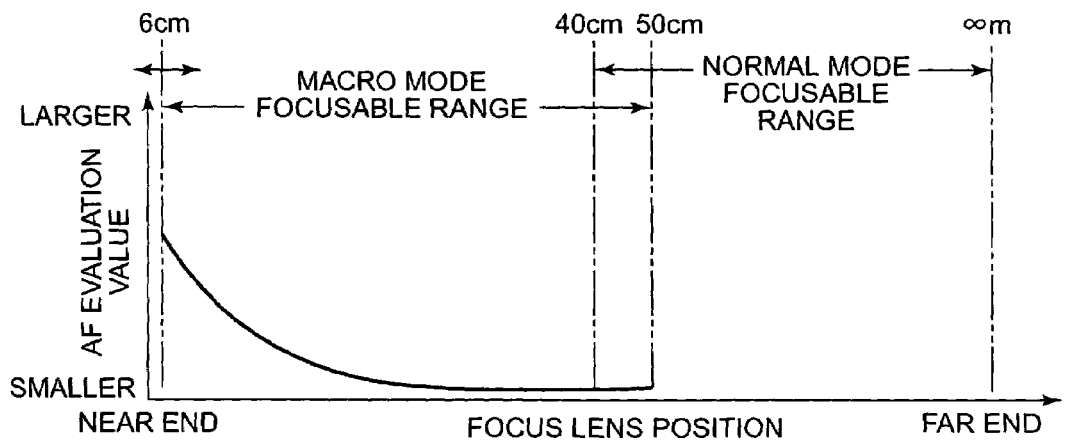

When in the AF process the focused position cannot be found (NO in step SA3), and the set AF mode is the macro mode at this time ("macro" in step SA8), it is checked whether the AF evaluation value tends to increase toward the near end of the focus search range, for example, as shown in FIG. 8B (step SA14). If so, it is determined that the distance from the camera to the object is shorter than that from the camera to the near end of the focusable range in the macro mode. Thus, a warning message that notifies the user that the camera is not focusable (for example, "Too close") is displayed, thereby informing the user that the camera is too close to the object to focus (step SA16). Then, focus lens 2 is moved to the predetermined reference position (step SA13) and then control passes to step SA5.

Figure 8C:
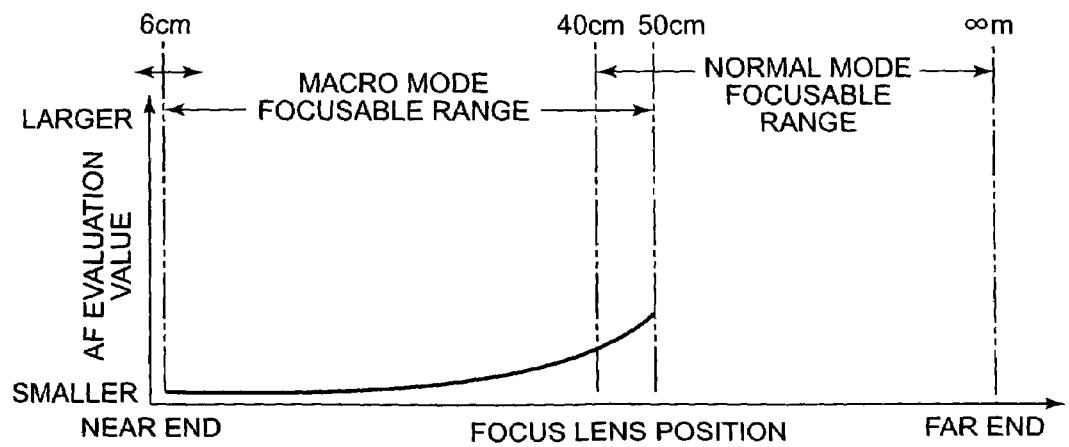

When the determination is NO in step SA14 and the AF evaluation value does not tend to increase toward the near end of the focus search range, it is further determined whether the AF evaluation value tends to increase toward a far end of the focus search range (step SA17), for example, as shown in FIG. 8C. If so, it is determined that the distance from the camera to the object is within the search range in the normal mode. Thus, the mode is changed automatically from the AF mode to the normal mode (step SA18). Then, first area 101 of the predetermined size is set as the AF area at the center of picture 100, as shown in FIG. 4A (step SA19). Subsequently, as shown in FIG. 5A, first AF frame 111 corresponding in size to first area 101 is displayed at the position of first area 101 over through image 110 displayed on the color LCD of image display 14 with the mode icon 121 indicating the normal mode displayed at the upper left corner of image 110 (step SA20). Then, control returns to step SA1 where the focus research range is changed and then the AF process is again performed.

When the determination is NO in any of steps SA14 and SA17, and the AF evaluation value has no trends mentioned above, or no peak positions can be searched on the AF evaluation value distribution curve (including a case in which the object is dark), focus lens 2 is moved to the reference position (including the center position of the focus research range in the macro mode) (step SA13), and then control passes to step SA5. Also in this case, the user temporarily releases the half depressed shutter key, changes the focused point on the object to another, and then depresses the shutter key half again or depresses the shutter key fully for image pickup.

While in the embodiment the "spot" AF area is assumed to be set at the center of the picture, it may be set at any position on the picture.

While in the embodiment digital camera 1 with the AF function in the contrast detection system using the image data displayed as the through image has been illustrated, the present invention is also applicable to digital cameras that use a CCD as a dedicated focus sensor. The present invention is also employable in cellular phones with a camera, PDAs with a camera, conventional cameras with a strobe, etc. In this case, also, advantageous effects produced by the embodiment can be produced.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A camera apparatus comprising:
   focus area setting means for setting a focus area on an image of an object to be picked up;
   auto-focus performing means for performing an auto-focus operation based on image information in the focus area set by the focus area setting means;
   operational mode selecting means for selecting one of a plurality of different operational modes that have respective different focusable distances from the camera apparatus to the object, wherein the plurality of different operational modes include a normal mode and a macro mode;
   first focus area control means for causing the focus area setting means to set a first area as the focus area when the operational mode selected by the operational mode selecting means is the normal mode;

first display control means for displaying on a display a first focus frame corresponding in position and size to the first area such that the first focus frame is superimposed on the object image;

second focus area control means for causing the focus area setting means to set a second area narrower than the first area as the focus area when the operational mode selected by the operational mode selecting means is the macro mode; and second display control means for displaying on the display a second focus frame corresponding in position and size to the second area such that the second focus frame is superimposed on the object image;

wherein the operational mode selecting means comprises means for selecting another one of said operational modes when the auto-focus performing means fails in performing the auto-focus operation; and wherein the auto-focus performing means performs the auto-focus operation in a focus search range corresponding to the selected operational mode.

2. The camera apparatus of claim 1, wherein the operational mode selecting means selects one of the plurality of different operational modes in response to a user's manual selecting operation.

3. The camera apparatus of claim 1, comprising:
means for displaying the object image; and
means for displaying on the displaying means the focus area set by the focus area setting means.

4. The camera apparatus of claim 1, wherein each of the first and second focus area control means causes the focus area setting means to set a single focus area.

5. The camera apparatus of claim 1, further comprising:
set mode selecting means for selecting any one of a first set mode that causes the focus area setting means to set a single focus area on the object image, and a second set mode that causes the focus area setting means to set a plurality of different focus areas on the object image, and wherein:

the first focus area control means causes the focus area setting means to set a single first area as the focus area when the operational mode selected by the operational mode selecting means is the normal mode and the set mode selected by the set mode selecting means is the first set mode;

the second focus area control means causes the focus area setting means to set a single second area narrower than the first area as the focus area when the operational mode selected by the operational mode selecting means is the macro mode and the set mode selected by the set mode selecting means is the first set mode.

6. The camera apparatus of claim 5, further comprising:
third focus area control means for causing the focus area setting means to set a plurality of different areas as the focus area when the set mode set by the set mode selecting means is the second set mode.

7. An auto-focus control method comprising:
selecting one of a plurality of different operational modes that have respective different focusable distances, wherein the plurality of different operational modes include a normal mode and a macro mode;

setting a first area as a focus area on an image of an object to be picked up when the normal mode is selected as the operational mode;

displaying on a display a first focus frame corresponding in position and size to the first area such that the first focus frame is superimposed on the object image;

setting a second area narrower than the first area as the focus area when the macro mode is selected as the operational mode;

displaying on a display a second focus frame corresponding in position and size to the second area such that the second focus frame is superimposed on the object image; and performing an auto-focusing operation based on image information in the set focus area;

wherein when the auto-focus operation fails to be performed, another one of said operational modes is selected; and wherein the auto-focus operation is performed in a focus search range corresponding to the selected operational mode.

8. A computer readable medium having stored thereon an auto-focus control program that causes a computer of a camera to perform functions of:

selecting one of a plurality of different operational modes that have respective different focusable distances, wherein the plurality of different operational modes include a normal mode and a macro mode;

setting a first area as a focus area on an image of an object to be picked up when the normal mode is selected as the operational mode;

displaying on a display a first focus frame corresponding in position and size to the first area such that the first focus frame is superimposed on the object image;

setting a second area narrower than the first area as the focus area when the macro mode is selected as the operational mode;

displaying on a display a second focus frame corresponding in position and size to the second area such that the second focus frame is superimposed on the object image; and performing an auto-focusing operation based on image information in the set focus area;

wherein when the auto-focus operation fails to be performed, another one of said operational modes is selected; and wherein the auto-focus operation is performed in a focus search range corresponding to the selected operational mode.

* * * * *